United States Patent

Sato et al.

[11] Patent Number: 5,612,424
[45] Date of Patent: Mar. 18, 1997

[54] FIBER-REINFORCED RESIN COMPOSITION

[75] Inventors: Shoichi Sato, Sagamihara; Tohru Imanara, Atsugi; Takao Uematsu, Sagamihara, all of Japan

[73] Assignee: Mitsubishi Chemical Industries, Ltd., Tokyo, Japan

[21] Appl. No.: 292,927

[22] Filed: Aug. 18, 1994

Related U.S. Application Data

[63] Continuation of Ser. No. 60,516, May 12, 1993, abandoned, which is a continuation of Ser. No. 722,142, Jun. 27, 1991, abandoned.

[30] Foreign Application Priority Data

Jun. 27, 1990 [JP] Japan .................... 2-169539
Jul. 11, 1990 [JP] Japan .................... 2-183811

[51] Int. Cl.$^6$ .................................. C08F 283/00
[52] U.S. Cl. ................ 525/530; 525/531; 525/533; 525/921; 525/935; 523/202; 523/208; 523/400; 428/320.2; 428/413; 428/500
[58] Field of Search ................ 428/413, 320.2, 428/500; 525/530, 531, 533, 31, 921, 935; 523/202, 208, 400

[56] References Cited

U.S. PATENT DOCUMENTS

| | | | |
|---|---|---|---|
| 4,503,200 | 3/1989 | Corley | 525/532 |
| 4,507,432 | 3/1985 | Banno et al. | 525/531 |
| 4,522,072 | 6/1985 | Abbey et al. | 523/410 |
| 4,853,279 | 8/1989 | Shibata et al. | 525/531 |
| 4,873,309 | 10/1989 | Corley | 525/530 |
| 4,874,833 | 10/1989 | Kershaw | 525/530 |
| 4,962,162 | 10/1990 | Kosuda et al. | 525/530 |
| 5,055,532 | 10/1991 | Hoffman et al. | 525/530 |
| 5,077,324 | 12/1991 | Kistner et al. | 525/31 |

FOREIGN PATENT DOCUMENTS

| | | |
|---|---|---|
| 0096906 | 12/1983 | European Pat. Off. . |
| 0339635 | 11/1989 | European Pat. Off. . |
| 01200951 | 8/1989 | Japan . |
| 01261430 | 10/1989 | Japan . |
| 01247429 | 10/1989 | Japan . |
| 01278523 | 11/1989 | Japan . |
| 02212506 | 8/1990 | Japan . |

*Primary Examiner*—John C. Bleutge
*Assistant Examiner*—Randy Gulakowski
*Attorney, Agent, or Firm*—Wenderoth, Lind & Ponack

[57] ABSTRACT

A fiber-reinforced resin composition, which comprises:

an epoxy resin having at least two epoxy groups in the molecule, a polymerizable unsaturated group-containing epoxy compound of the following general formula [I],

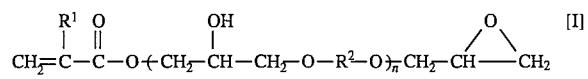

wherein $R^1$ is H or $CH_3$, $R^2$ is an alkylene group having 1 to 20 carbon atoms, and n is an integer of 0 to 20, a liquid carboxylic acid anhydride containing a monofunctional carboxylic acid anhydride and/or a polyfunctional carboxylic acid anhydride obtained by reacting a lower aliphatic polyhydric alcohol with a trimellitic acid or a derivative thereof, a curing promoter, a radical polymerization initiator, and a fiber, the glass transition temperature (Tg, °C.) and breaking strain (E, %) of a cured product of said composition satisfying the following formulae:

$$Tg \geq -17E + 240$$

$E \geq 4$, and $Tg \geq 125$.

20 Claims, No Drawings

FIBER-REINFORCED RESIN COMPOSITION

This application is a continuation of now abandoned application Ser. No. 08/060,516, filed May 12, 1993, which is a continuation of now abandoned application Ser. No. 07/722,142, filed Jun. 27, 1991.

BACKGROUND OF THE INVENTION

1. Field of the Invention

The present invention relates to a fiber-reinforced resin composition, and more specifically, to a resin composition having excellent resin properties for producing a composite material suitable for automobile parts, electric parts, etc., by a RIM, RRIM, SRIM or RTM method, and giving a well-molded fiber-reinforced resin composite material.

2. Related Art

Fiber-reinforced composite materials containing a plastic as a matrix are widely used in the fields of automobile parts, electric parts, construction materials, shipbuilding, sporting goods, aircraft parts, etc. As a reinforcing fiber material, glass, aramide and carbon fibers are used. As a matrix resin, a variety of matrix resins such as urethane, unsaturated polyester, vinyl ester and epoxy resins are used. And, fiber-reinforced composite materials are produced by a variety of molding or forming methods such as hand lay-up molding, filament winding, pultrusion, prepreg pressure-forming, BMC molding, SMC molding and other methods. A reaction injection molding method, which has been hitherto established, is excellent in that its molding cycle is quick and a wide variety of molded articles can be obtained by automating. In recent years, there is an increasing demand for molded articles having a large size and a complicated form, produced by this method. Molded articles produced by this method as a structural material are required to have high mechanical properties, heat resistance, durability, and the like.

Various matrix resins are conventionally used in fiber-reinforced materials produced by a reaction injection molding method. The features and defects of main matrix resins are as follows. A urethane resin is cured rapidly but is insufficient in heat resistance. An unsaturated polyester resin is also cured rapidly, but does not fully meet with other properties. A vinyl ester resin is excellent in corrosion resistance and workability, whereas, it tends to be low in composite material properties and heat resistance as compared with an epoxy resin, and causes deterioration of surface properties, etc., due to shrinkage during the curing time. Meanwhile, an epoxy resin has relatively high heat resistance and is excellent in corrosion resistance and mechanical strength. However, it has a low curing rate and a high viscosity Further, it is also pointed out that an epoxy resin is inferior in impact resistance and toughness. Although studies have been undertaken to obtain an epoxy resin having improved properties, it is difficult to satisfy all of the low viscosity and properties of heat resistance and high toughness. In the case of a fiber-reinforced resin composite material containing a reinforcing fiber, in particular, a resin cured product is required to have breaking extension which is not lower than that of the reinforcing fiber in order to fully exhibit mechanical properties inherent to the fiber itself. Especially, in order for a fiber-reinforced resin composite material to keep sufficiently high fatigue properties, a cured product is required to have considerably higher breaking strain than the fiber. For example, when a glass fiber having a breaking strain of 4% is used as a reinforcing material, a resin is required to have a breaking strain of not less than this value, and no such resin composition practically and fully meeting these conditions is known at present.

Concerning an epoxy resin, JP-A-63-218325 discloses a RIM production process using an epoxy resin containing an alicyclic amine-based curing agent and having a relatively high curing rate. Since, however, an epoxy resin having a high curing rate required for this reaction injection molding has, in general, a very high viscosity, such an epoxy resin has poor impregnability to a preliminarily placed reinforcing materials such as a continuous fiber, fabric, etc., and this poor impregnability causes voids or nonimpregnation portions in a molded article. This tendency becomes particularly outstanding when a reinforcing material is charged at a high density. And, an amine-based curing agent sometimes causes safety and health issues and deteriorates the working environment.

It is generally known to add a reactive diluent such as an aliphatic glycidyl ether, a monofunctional epoxy compound, or the like to an epoxy resin in order to decrease the viscosity of an epoxy resin for the purpose of overcoming failure in impregnation. However, the resin in which the reactive diluent has been incorporated clearly shows degradation in heat resistance, mechanical properties, water resistance, etc., and it is difficult to satisfy demanded performances. The toughness is conventionally improved by incorporating acryl rubber or an acrylonitrile-butadiene copolymer having a carboxyl group, etc., as a terminal group into an epoxy resin.

However, the above methods cause an increase in viscosity of a resin mixture and degradation in heat resistance, elastic modulus, water resistance, etc., of a cured product.

In particular, it is very difficult to obtain a resin composition having a low viscosity and a rapid curing rate which are necessary for RIM molding, satisfying heat resistance and toughness of a cured product, and having excellent durability.

JP-A-1-22848 discloses that the resin composition is improved in the viscosity and pot life and that the resultant cured product shows improved heat resistance by using a polycarboxylic acid anhydride curing agent system and a vinyl aromatic hydrocarbon. In this method, the heat resistance is improved in thermal deformation temperature, etc. However, the resultant cured product has an insufficient breaking strain, and shows degraded strength. In JP-A-63-170410, the workability and heat resistance are improved by using an imidazole compound and a radical polymerization initiator in combination. Even in this method, however, it is difficult to obtain a cured product having a sufficient breaking strain together with sufficient heat resistance.

JP-B-1-29815 and JP-B-1-29816 disclose processes for producing a prepreg or a laminated plate containing a polybasic acid anhydride curing agent system and an unsaturated polyester or epoxy vinyl ester resin. In these processes, the curing rate and the cured product properties are improved. However, the resin compositions used in these publications have a relatively high viscosity, and show poor impregnation into a reinforcing fiber when molded by a RIM method, which causes remaining voids. Further, since the resin compositions used in the above publications show a high shrinkage when molded, it is difficult to obtain a molded article having excellent surface smoothness.

Further, JP-A-1-278523 discloses a fiber-reinforced resin composite material containing an epoxy resin, glycidyl methacrylate, vinyl ester, a curing agent for the epoxy resin and a cure promoter. However, this material is insufficient for the improvement in both breaking strain or elastic modulus and heat resistance.

SUMMARY OF THE INVENTION

It is an object of the present invention to provide a fiber-reinforced resin composition, which is suitably produced by a reaction injection molding or RTM method and which has excellent mechanical properties such as high heat resistance, high elasticity and excellent toughness.

It is another object of the present invention to provide a fiber-reinforced resin composition, which can be produced in a quicker molding cycle due to rapid curability and a low viscosity of a resin mixture.

It is further another object of the present invention to provide a fiber-reinforced resin composition, which is free from defects such as voids, nonimpregnation portions in a molded article, etc., and which permits high impregnation of a mixture resin and charging of fibers at a high density.

Further, it is another object of the present invention to provide a fiber-reinforced resin composition, which is widely suitable for automobile structural materials, electric parts, sporting goods, aircraft parts, and the like.

According to the present invention, there is provided a fiber-reinforced resin composition, which comprises the following reactive resin Components A, B, C, and E and a fiber:

Component A: an epoxy resin having at least two epoxy groups in the molecule,

Component B: a polymerizable unsaturated group-containing epoxy compound of the following general formula [I],

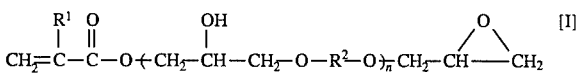

wherein $R^1$ is H or $CH_3$, is an alkylene group having 1 to 20 carbon atoms, and n is an integer of 0 to 20, Component C: a liquid carboxylic acid anhydride containing a monofunctional carboxylic acid anhydride and/or a polyfunctional carboxylic acid anhydride obtained by reacting a lower aliphatic polyhydric alcohol with a trimellitic acid or a derivative thereof, Component D: a curing promoter, and Component E: a radical polymerization initiator, the glass transition temperature (Tg, °C.) and breaking strain (E, %) of a cured product of said composition satisfying the following formulae:

$$Tg \geq -17E + 240$$

$E \geq 4$, and
$Tg \geq 125$.

DETAILED DESCRIPTION OF THE INVENTION

The present inventors have made a diligent study to overcome the above problems in the reaction injection molding of an epoxy resin, and as a result, have found that the use of an epoxy resin, an epoxy compound having a specific polymerizable unsaturated group and a liquid carboxylic acid anhydride as a curing agent permits molding of the epoxy resin at a relatively low temperature between about 100° C. and about 120° C. for a short period of time, and can promptly give a molded article having high heat resistance and high toughness, being reinforced with a continuous fiber, etc., charged at a high density, and being substantially free from any void and nonimpregnation portion.

The epoxy resin as Component A used in the present invention is a compound having two or more epoxy groups in the molecular terminii. In general, this epoxy resin is synthesized by a method which comprises subjecting an epihalohydrin to an addition reaction in an excess amount, relative to a novolak resin, etc., of an epihalohydrin (e.g. epichlorohydrin) at a temperature of not higher than 100° C., and adding a caustic alkali aqueous solution dropwise at a temperature between 40° C. and 100° C. under reduced pressure to epoxidize the addition reaction product while distilling water off from the reaction system by azeotropy, or by a method which comprises epoxidizing an unsaturated double bond portion with peracetic acid.

The epoxy resin is selected from glycidyl ether type epoxy resins, glycidyl amine type epoxy resins, glycidyl ester type epoxy resins, heterocyclic epoxy resins, halogenated epoxy resins, etc., which are reaction products of bisphenol A, bisphenol F, a novolak resin, etc., with epihalohydrin. These epoxy resins are used alone or in combination. In order to fully achieve high impregnation which is one of the objects of the present invention, preferred are those epoxy resins which are in a liquid state at room temperature and have a low viscosity when used alone or as a mixture. In particular, the epoxy resin obtained from bisphenol F is effective and preferred with regard to the viscosity of a resin mixture for high impregnation as one of the objects of the present invention, wettability to a reinforcing fiber, properties of a resin cured product, etc.

The polymerizable unsaturated group-containing epoxy compound used in the present invention has a radical-polymerizable acryl or methacryl group in one terminal and an addition-polymerizable epoxy group in the other terminal as shown in the general formula [I], and such an epoxy compound is selected from glycidyl methacrylate and those compounds obtained by adding a (meth)acrylic acid to one terminal of diglycidyl ether or an alkylene group-containing polyglycidyl compound such as ethylene glycol, propylene glycol, 1,4-butanediol, 1,5-hexanediol, neopentyl glycol, polyethylene glycol, polypropylene glycol, or the like. Of these epoxy compounds, glycidyl methacrylate has a high effect on achievement of a low viscosity as one object of the present invention due to its very low viscosity (about 3 cps/25° C.). Further, a tough, resin cured product having not only an improved elastic modulus with retaining heat resistance, a glass transition temperature (Tg) and suitable cured product breaking strain, but also excellent impact strength can be obtained by curing the epoxy group and the unsaturated group under heat at the same time.

In general, the use of a compound containing a polymerizable unsaturated group improves the curing rate and heat resistance. However, the use of such compound has problems that the breaking strain is decreased, the cure shrinkage at a molding time becomes greater, and the like.

For example, when an epoxy resin and a compound containing a polymerizable unsaturated group such as vinyl ester are cured together, the cure reactivity of each of the epoxy group and the vinyl group has a large influence on the cured product properties.

That is, a vinyl ester compound having only a polyfunctional radical-polymerizable group tends to accelerate the curing reaction when cured together with the epoxy, and the resultant cured product is liable to undergo a phase separation between the epoxy polymer network and the vinyl ester polymer network. These are considered to cause a decrease in breaking strain.

Component B of the general formula [I] has both a vinyl group and an epoxy group which are polymerizable unsaturated groups. Therefore, the epoxy group of the compound of the general formula [I] reacts in the polymer network of the Component A epoxy resin through the Component C curing agent, and further, the crosslinking reaction among Components B proceeds by polymerization of the vinyl group. Due to this, the crosslinked Components B are entangled with the polymer network of the Component A epoxy resin. Therefore, the resultant cured product has a uniform polymer network structure, and accordingly has well-balanced properties between heat resistance and breaking strain. In general, when the breaking strain of a resin cured product is increased, the heat resistance is decreased. Thus, it is difficult to achieve these two properties at the same time. In the cured product of the present invention, the breaking strain is not less than 4% since generally used glass fibers have a breaking strain of 4%, and the heat resistance (Tg) is not less than 125° C. in view of practical use as a structural material. In order to obtain a cured product having excellent toughness by this curing reaction, it is important that the reactivity of the epoxy group and the reactivity of the vinyl group are equal or the curing reaction is carried out such that the reaction of the vinyl group proceeds a little slower. In view of this, it is undesirable to use other polymerizable vinyl compound in combination, since the use of such compound destroys this balance and it is made difficult to obtain a uniform netting structure.

In the resin composition of the present invention, the curing reactivity is properly adjusted with the curing promoter as Component D and the radical polymerization initiator as Component E.

The resin composition of the present invention is useful, since the objects of the present invention can be easily achieved by carrying out the molding and curing at a temperature approximately between 100° C. and 150° C. for 5 to 20 minutes. When the molding temperature is higher than the above upper limit, undesirably, the temperature inside the mold increases due to a rapid reaction. As a result, coloring and sink marks spoil the appearance of a cured product and the breaking strain is liable to decrease. When the molding temperature is lower than the above lower limit, the molding takes a longer time, and the epoxy group and the vinyl group are not cured simultaneously. As a result, the heat resistance is decreased. When the molding time is longer than the above range, the productivity is low. When the molding time is shorter, the curing is not sufficient and the mold releasability is undesirably deteriorated.

In the present invention, the resin mixture is also improved in the curing reactivity and achievement of a low viscosity without using any other unsaturated compounds such as an unsaturated monomer compound, unsaturated polyester, a vinyl ester resin, etc., in combination. Further, the degree of shrinkage at a cure time during the molding, which is a defect of a radical-polymerizable compound having an unsaturated group, is small, and a fiber-reinforced resin composite material having excellent surface smoothness can be obtained.

The carboxylic acid anhydride curing agent used as Component C in the present invention is in a liquid state at room temperature, and is selected from monofunctional carboxylic acid anhydrides and polyfunctional carboxylic acid anhydrides obtained by reacting lower aliphatic polyhydric alcohols with a trimellitic acid or a derivative thereof. These monofunctional carboxylic acid anhydrides and polyfunctional carboxylic acid anhydrides are used alone or in combination. Examples of the monofunctional carboxylic acid anhydrides are 3-methyltetrahydrophthalic anhydride, 4,-methyltetrahydrophthalic anhydride, 3-methylhexahydrophthalic anhydride, 4-methylhexahydrophthalic anhydride, methyl Nadic anhydride, dodecenylsuccinic anhydride, and structural isomers or geometric isomers thereof. As a monofunctional carboxylic acid anhydride, preferred are those which have a viscosity, at 25° C., of not more than 500 cps and are in a liquid state. When the viscosity is more than 500 cps, it is difficult to achieve a sufficiently low viscosity.

Examples of the polyfunctional carboxylic acid anhydrides are liquid modified products containing a reaction product obtained by reacting a lower aliphatic polyhydric alcohol with trimellitic acid or a derivative thereof. As a lower aliphatic polyhydric alcohol as one component of the polyfunctional carboxylic acid anhydride, preferred are those having 2 to 10 carbon atoms. The lower aliphatic polyhydric alcohol is selected, for example, from ethylene glycol, propylene glycol, 1,4-butanediol, glycerol, trimethylolethane, trimethylolpropane, pentaerythritol, hexanetriol, etc.

Of the above carboxylic acid anhydrides, particularly preferred is methyltetrahydrophthalic anhydride in view of stability and reactivity.

The cure promoter as Component D used in the present invention is selected from Lewis acids, $BF_3$, amine complexes, tertiary amines and salts thereof, imidazole and complexes thereof, organic phosphine compounds, etc. Preferred are imidazole and organic phosphine compounds. Examples of the imidazole compounds are 2-ethylimidazole, 2-undecylimidazole, 2-pentadecylimidazole, 2-methyl-4-ethylimidazole, 1-butylimidazole, 1-propyl-2-methylimidazole, 1-cyanoethyl-2-methylimidazole, 1-cyanoethyl-2-undecylimidazole, 1-cyanoethyl-2-phenylimidazole, 1-azine-2-methylimidazole, 1-azine-2-undecylimidazole, etc. Specific examples of the organic phosphine compounds are tertiary phosphine compounds such as triphenylphosphine, tricyclohexylphosphine, etc., secondary phosphine compounds such as butylphenylphosphine, diphenylphosphine, etc., primary phosphine compounds such as phenylphosphine, octylphosphine, etc., and tertiary bisphosphine compounds such as bis(diphenylphosphino)methane, 1,2-bis-(diphenylphosphino)ethane, etc. These compounds may be used alone or in combination.

The radical polymerization initiator used as Component E in the present invention is selected from conventional organic peroxides which generate radicals under heat to polymerize the radical-polymerizable group positioned in one terminal of the polymerizable unsaturated group-containing epoxy compound. Examples of the organic peroxides are azo compounds such as azoisobutyronitrile, t-butyl perbenzoate, t-butylperoxy-2-ethylhexanoate, t-butylperoxyisopropylcarbonate, 1,1-bis(t-butylperoxy)-3,3,5-trimethylcyclohexane, n-butyl-4,4-bis(t-butylperoxy)valerate, benzoyl peroxide, t-peroctoate, acetoacetic ester peroxide, methyl ethyl ketone peroxide, dicumyl peroxide, t-butyl hydroperoxide, and the like. These peroxides may be used alone or in combination.

The amount of the polymerizable unsaturated group-containing epoxy compound as Component B per 100 parts by weight of Component A is 5 to 300 parts by weight, preferably 10 to 200 parts by weight, more preferably 20 to 150 parts by weight. When this amount is less than the above lower limit, the degrees of effects on improvement in achievement of a low viscosity, heat resistance, breaking strain, elastic modulus and toughness are small. When this amount exceeds the above upper limit, the resultant cured product is undesirably liable to show degradation in heat resistance, mechanical properties and breaking strain.

The liquid carboxylic acid anhydride curing agent as Component C is used in such an amount that the equivalent weight ratio of the functional group of the carboxylic acid anhydride to the epoxy groups of Components A and B is 1.0/0.3 to 1.0/1.4, preferably 1.0/0.4 to 1.0/1.2. When the amount of Component C is less than this range, the resultant cured products shows degradation in heat resistance and breaking strain, and the degree of the effect on achievement of a low viscosity is small. When this amount exceeds the above range, the heat resistance is undesirably deteriorated. Further, the viscosity of the resin mixture can be decreased more effectively when the monofunctional carboxylic acid anhydride is used alone. However, the rapid curing properties and heat resistance can be further improved when the polyfunctional carboxylic acid anhydride is used in combination in an amount of 2 to 80% by weight, preferably 5 to 40% by weight based on the monofunctional carboxylic acid anhydride. When this amount is less than the above lower limit, there is little effect on improvement in the rapid curing properties and heat resistance. When it is more than the above upper limit, undesirably, the viscosity increases, and it is difficult to obtain an intended molded article.

The amount of the cure promoter as Component D is not specially limited, and the cure promoter is to suitably control the reaction rate. The cure promoter is preliminarily dissolved in Component C before use. Otherwise, it may be also dissolved in Components A and B if it substantially does not promote homopolymerization of the epoxy resin. The cure promoter is incorporated such that the amount thereof per 100 parts by weight of Components A and B is generally 0.1 to 20 parts by weight, preferably 1 to 10 parts by weight.

The amount of the radical polymerization initiator as Component E is not specially limited, either. In general, Component E is incorporated such that the amount thereof per 100 parts by weight of Component B is 0.05 to 20 parts by weight, preferably 0.2 to 10 parts by weight.

A mixture of Components A, B and C has a relatively low viscosity, gives a high-level fiber-reinforced resin composite material having a high filling density, and improves the viscosity, curing reactivity and toughness of a cured product, in which points a conventional epoxy resin system has been inferior.

In RIM, a liquid A substantially containing Components A and B and a liquid B substantially containing Components C, D and E are better mixed when the mixing ratio of these liquids in parts by volume is nearer to 1/1.

The molding is carried out as follows. Reactive resin components of the liquid A and those of the liquid B are mixed with a mixing head, a static mixer, etc., at a high velocity, then, the resultant mixture is injected into a mold, heated to and set at a predetermined temperature and cured, and the mold is removed. The reinforcing fiber may be in the form of a mat, a fabric, etc., or may have a sandwich structure having, as a core, a foaming material such as urethane, epoxy, etc., as required. These fibers may be preset in the mold. Otherwise, a short fiber may be mixed with the resin before the resin mixture is injected. The molded article intended by the present invention can be produced in a quick molding cycle, and the time required from the injection to removal of a mold is not more than 10 minutes, preferably not more than 5 minutes, more preferably not more than 3 minutes. The temperature and time actually required for the molding are properly determined depending upon the reactivity of the resin composition, the form of the molded article, the thickness, and the like. The resin composition of the present invention is also excellent in releasability from a mold since it has high curing reactivity after gelling. The molded article is optionally heat-treated for a short period of time to complete the curing, whereby a fiber-reinforced resin composite material having excellent heat resistance and mechanical properties can be obtained.

In addition to the above Components, an epoxide reactive diluent may be incorporated to such a degree that the reactivity, heat resistance, toughness, etc., are not deteriorated. Such a diluent is selected from phenyl glycidyl ether, butyl glycidyl ether, alkyl glycidyl ether, styrene oxide, octylene oxide, and mixtures of these.

In addition, the resin composition of the present invention may contain components other than the above Components A to E if such other components do not deteriorate the properties thereof. However, the resin composition of the present invention is preferably a composition which substantially contains Component A to E only. The "composition which substantially contains Components A to E" refers to a composition in which the content of components other than the Components A to E is not more than 1% by weight, preferably 0.5% by weight.

In addition, a coupling agent such as silane and titanate compounds, a mold releasing agent such as higher fatty acid, wax, etc., a fire retardancy-imparting agent such as halogen and phosphorus compounds, an additive such as an antifoamer, a colorant, etc., may be used as required.

The reinforcing material of a continuous fiber used in the present invention is selected from a glass fiber, an aramide fiber, a polyester fiber, a carbon fiber, a silicon carbide fiber, an alumina fiber, etc. These fibers are used in the form of a tape, a sheet, a mat, a fabric, a woven fabric, etc., and may be used in combination depending upon required properties. Reinforcing materials of short fibers of these may be also used as required. The amount of the reinforcing fiber material by volume is preferably 2 to 70% based on the total amount of the reinforcing fiber material and the resin components by volume. The constitution and amount thereof are suitably selected depending upon required properties.

The epoxy resin composition of the present invention is suitable for reaction injection molding, and yet it is also useful since it can also be formed into a desired composite material by a known forming method such as a filament widing method, a pultrusion method, etc.

EXAMPLES

The present invention will be explained further in detail hereinafter by reference to Examples, to which, however, the present invention shall not be limited. In Examples, "part" stands for part by weight unless otherwise specified, and the mixing ratio of a carboxylic acid anhydride to an epoxy resin (A) and an epoxy compound (B) in each Example was selected such that the acid anhydride equivalent/epoxy equivalent weight ratio was 1.0.

In addition, a resin mixture at 25° C. was measured for a viscosity as one of resin properties with an EM rotation viscometer. Fiber-reinforced composite materials were prepared by injecting a composition described in each of Examples 1 to 7 and Comparative Examples 1 to 8 as a liquid A (consisting of Components A and B) and a liquid B (consisting of Components C, D and E) into a 400×700×2 mm flat plate mold under heat at 120° C. which was set in a reaction injection molding machine (MC-102N, supplied by Polyurethane Engineering Co., Ltd.) and releasing the resultant product from the mold 5 minutes after the injection (or 10 minutes after the injection in Comparative Examples 2 to 8). Further, for measurement of properties of resin cured products, cast plates were prepared by means of a 300×300 mm mold and cured in an oven at 120° C. for 0.5 hour and at 150° C. for 1 hour. The resin cured products (cast plates) were measured for a glass transition temperature (Tg) on the basis of a change in thermal expansion curve according to TMA method. Further, these resin cured products and the fiber-reinforced composite materials were measured for flexural properties and a breaking strain which corresponds to toughness, with "UTM-5T" of Orientec Co. by a three-point bending test according to ASTM-D790. Table 1 shows the results.

EXAMPLE 1

Glass fiber continuous strand mats ("CSM 8600", supplied by Asahi Fiber Glass, weight of reinforcing material: FAW (fiber areal weight)=600 g/m$^2$) were stacked to form 4 plies (reinforcing fiber content by volume: Vf=47.0%), placed in a RIM machine, and clamped at 20 kg/cm$^2$.

50 Parts of bisphenol F type glycidyl ether ("Epiclon 830", supplied by Dainippon Ink & Chemicals, Inc), which was heated to 80° C. and defoamed, as Component A, 50 parts of glycidyl methacrylate ("SY monomer G", supplied by Sakamoto Yakuhin Kogyo Co., Ltd.) as Component B, 106 parts of methyltetrahydrophthalic anhydride ("MT 500" supplied by New Japan Chemical Co., Ltd.), which was heated to 70° C. and nitrogen-sealed, as Component C, 5 parts of 2-ethyl-4-methylimidazole ("2E4MZ", supplied by Shikoku Chemicals Co.) as Component D, and 1 part of 1,1-bis(t-butylperoxy)-3,3,5-trimethylcyclohexane ("Perhexa 3M", supplied by Nippon Oil & Fats Co., Ltd.) as Component E were injected into the mold. As a result, a molded article which was substantially free from any non-impregnation portion and void and had excellent surface properties was obtained.

EXAMPLE 2

In the same manner as in Example 1, 22 plies of plain-woven glass fibers ("MS132-3NT-10FS", supplied by Asahi Fiber Glass, FAW=100 g/m$^2$) and 1 ply of "CSM 8600" (FAW=600 g/m$^2$) as an inner layer (Vf=53.7%) were stacked in a mold. Thereafter, 70 parts of Epiclon as Component A, 30 parts of "SY monomer G" as Component B, 108 parts of a polyfunctional curing agent formed by incorporating 15% of trimellitic acid triglyceride into methyltetrahydrophthalic anhydride ("MTA15", supplied by New Japan Chemical Co., Ltd.) as Component C, 5 parts of "2E4MZ" as Component D, and 1 part of "Perhexa 3M" as Component E were injected into the mold, and the mold was removed.

EXAMPLES 3 AND 4

In the same manner as in Example 1, "CSM 8600" was stacked to form 4 plies in a mold. Then, 50 or 70 parts of bisphenol A type glycidyl ether ("E 827", supplied by Yuka Shell Epoxy Kabushiki Kaisha) as Component A, 50 or 30 parts of "SY monomer G" as Component B, 104 parts of "MT 500" or 106 parts of "MTA 15" as Component C, 5 parts of "2E4MZ" as Component D, and 1 part of t-butylperoxy-2-ethylhexanoate ("Perbutyl O" supplied by Nippon Oil & Fats Co., Ltd.) were injected into the mold, and the mold was removed.

EXAMPLE 5

In the same manner as in Example 1, 80 parts of triglycidyl-4-amino-m-cresol ("ELM 100", supplied by Sumitomo Chemical Co., Ltd.) as Component A, 20 parts of 1,6-hexanediol.glycidyl ether.acrylate having an epoxy equivalent of 427 ("KAYARAD R-7038", supplied by Nippon Kayaku Co., Ltd.), synthesized from 1,6-hexanediol, as Component B, 132 parts of "MT-500" as Component C, 8 parts of "2E4MZ" as Component D and 1 part of "Perhexa 3M" as Component E were injected to a mold, and then, the mold was removed.

EXAMPLES 6 AND 7

In the same manner as in Example 1, 8 plies of plain-woven carbon fibers ("TRAYCA CO 6343", supplied by Toray Industries, Inc., FAW=198 g/m$^2$) and 1 ply of "CSM 8600" (FAW=600 g/m$^2$) as an inner layer (Vf=53.5%) were stacked in a mold. And, thereafter, 70 parts of tetraglycidyl m-xylylenediamine ("TETRAD-X, supplied by Mitsubishi Gas Chemical Co., Inc.) or 3,4-epoxycyclohexylmethyl-3,4-epoxycyclohexanecarboxylate ("ERL 4221", supplied by Union Carbide) as Component A, 30 parts of "R-7038" as Component B, 142 or 100 parts of "MTA 15" as Component C, 8 parts of "2E4MZ" or 10 parts of triphenylphosphine as Component D, and 1 part of "Perhexa 3M" as Component E were injected into the mold, and the mold was removed.

COMPARATIVE EXAMPLE 1

In the same manner as in Example 1, 4 plies of "CSM 8600" (VF=46.5%) was stacked in a mold. Then, 100 parts of a bisphenol A type epoxy resin ("E 828", supplied by Yuka Shell Epoxy Kabushiki Kaisha) in place of the bisphenol F type epoxy resin as Component A, 22.5 parts of isophoronediamine (epoxy/—NH equivalent weight ratio= 1.0), which was an alicyclic amine curing agent, as Component C, and 5 parts of salicylic acid as Component D were injected into the mold, and the mold was removed. The resultant molded article was whitened due to voids, and a nonimpregnation portion occurred in its end portion.

COMPARATIVE EXAMPLE 2

In the same manner as in Example 1, 100 parts of "Epiclon 830" as Component A, 94 parts of "MT 500" as Component C, and 10 parts of "2E4MZ" as Component D were injected into a mold, and then, the mold was removed. No nonimpregnation portion was found in the resultant molded article. However, the molded article was soft, and deformed when the mold was removed.

COMPARATIVE EXAMPLE 3

In the same manner as in Example 1, 100 parts of "ELM 100" in place of "Epiclon 830" as Component A, 155 parts of "MT 500" as Component C, and 10 parts of "2E4MZ" as Component D were injected into a mold, and the mold was removed. Sink marks and cracks were observed in the resultant molded article.

COMPARATIVE EXAMPLE 4

In the same manner as in Example 1, 100 parts of "SY monomer G" as Component B, 117 parts of "MT 500" as Component C, 5 parts of "2E4MZ" as Component D, and 1 part of "Perhexa 3M" as Component E were injected into a mold, and then, the mold was removed. The resultant molded article was fragile, and showed sink marks caused by curing shrinkage.

COMPARATIVE EXAMPLE 5

100 Parts of "R-7038" as Component B, 39 parts of "MT 500" as Component C, 5 parts of "2E4MZ" as Component D, and 1 part of "Perhexa 3M" as Component E were cured to obtain a resin cured product. The cured product was in the state of a hard rubber.

COMPARATIVE EXAMPLE 6

In the same manner as in Example 1, 50 parts of "Epiclon 830" as Component A, 50 parts of t-butyl methacrylate ("Light ester TB", supplied by Kyoeisha Chemical Co., Ltd.) as an unsaturated group-containing compound, 47 parts of "MT 500" as Component C, 5 parts of "2E4MZ" as Component D, and 1 part of "Perhexa 3M" were injected into a mold, and then, the mold was removed. The resultant molded article was softened, and deformed when the mold was removed.

COMPARATIVE EXAMPLE 7

In the same manner as in Example 1, 80 parts of "E 827" as Component A, 20 parts of propylene glycol diglycidyl ether ("Epolight 400P", supplied by Kyoeisha Chemical Co., Ltd.) as a reactive diluent, 83 parts of "MT 500" as Component C, and 10 parts of "2E4MZ" as Component D were injected into a mold, and then, the mold was removed. The resultant molded article was softened, and deformed when the mold was removed.

COMPARATIVE EXAMPLE 8

In the same manner as in Example 1, 60 parts of "TETRA D-X" as Component A, 40 parts of 1,4-butanediol diglycidyl ether ("DY 022", supplied by CIBA-GEIGY (Japan) Ltd.) as a reactive diluent, 151 parts of "MT 500" as Component C, and 10 parts of "2E4MZ" as Component D were injected into a mold, and then, the mold was removed.

Table 1 shows the above results.

The following Examples 8 to 11 and Comparative Examples 9 to 14 were carried out as follows.

Fiber-reinforced resin composite materials were prepared by respectively injecting resin compositions described in Examples 8 to 11 and Comparative Example 9 as liquids A and B into a 1,000×1,500×5 mm trial fender mold under heat at 120° C. with a reaction injection molding machine ("MC 216-N", supplied by Polyurethane Engineering Co., Ltd.) over about 10 seconds, and removing the mold 5 minutes after the injection. Further, resin compositions described in Comparative Examples 10 to 14 were respectively molded with a reaction injection molding machine ("MC 102-N", supplied by Polyurethane Engineering Co., Ltd.) and a 400×700×3 mm flat plate mold under the same conditions as above.

Further, each of resin mixtures at 25° C. was measured for a viscosity as one of the properties of the resin compositions with an EM type rotation viscometer. For measurement of properties of cured products, cast plates were prepared with a 300×300 mm mold and cured in an oven at 120° C. for 0.5 hour and at 150° C. for 1 hour. The resin cured products (cast plates) were measured for a glass transition temperature (Tg) on the basis of a change in a thermal expansion curve according to TMA method. Further, these resin cured products and the fiber-reinforced composite materials were measured for flexural properties and a breaking strain which corresponds to toughness, with "UTM-5T" of Orientec Co. by a three-point bending test according to ASTM-D790. Table 1 shows the results.

EXAMPLE 8

Glass fiber continuous strand mats ("CSM 8600", supplied by Asahi Fiber Glass Co., Ltd., weight of reinforcing material: FAW=600 $g/m^2$) were stacked to form 7 plies (reinforcing fiber content by volume: Vf=33.2%), placed in a mold, and clamped at 20 $kg/cm^2$.

50 Parts of bisphenol F type glycidyl ether ("Epiclon 830", supplied by Dainippon Ink & Chemicals, Inc), which was heated to 80° C. and defoamed, as Component A, 50 parts of glycidyl methacrylate ("SY monomer G", supplied by Sakamoto Yakuhin Kogyo Co., Ltd.) as Component B 106 parts (epoxy/acid anhydride equivalent weight ratio= 1.0) of methyltetrahydrophthalic anhydride ("MT 500" supplied by Shin Nippon Rikasha), which was heated to 70° C. and nitrogen-sealed, as Component C, 5 parts of 2-ethyl-4-methylimidazole ("2E4MZ", supplied by Shikoku Kasei Kogyo) as Component D, and 1 part of 1,1-bis(t-butylperoxy)-3,3,5-trimethylcyclohexane ("Perhexa 3M", supplied by Nippon Oil & Fats Co., Ltd.) as Component E were injected into the mold. As a result, a molded article which was substantially free from any nonimpregnation portion and void and had excellent surface properties was obtained.

EXAMPLE 9

In the same manner as in Example 8, "CSM 8600" was stacked to form 7 plies in a mold. Then, 50 parts of "Epiclon 830" as Component A, 50 parts of "SY monomer G" as Component B, 84 parts (epoxy/acid anhydride equivalent weight ratio=0.8) of "MT 500" as Component C, 5 parts of "2E4MZ" as Component D, and 1 part of "Perhexa 3M" as Component E were injected into the mold, and the mold was removed.

EXAMPLE 10

In the same manner as in Example 8, 13 plies of plain-woven glass fibers ("MS132-3NT-10FS", supplied by Asahi Fiber Glass, FAW=100 $g/m^2$) and 1 ply of "CSM 8600" (FAW=600 $g/m^2$) were stacked (Vf=33%) in a mold. Thereafter, 50 parts of "Epiclon 830" as Component A, 20 parts of "SY monomer G" as Component B, 70 parts of "MT 500" (epoxy/acid anhydride equivalent weigher ratio=1.0) as Component C, 5 parts of "2E4MZ" as Component D, and 1 part of "Perhexa 3M" as Component E were injected into the mold, and the mold was removed. A molded article free from any nonimpregnation portion and void was obtained.

EXAMPLE 11

In the same manner as in Example 8, 8 plies of plain-woven carbon fibers (TRAYKA C06343, supplied by Toray Industries, Inc., FAW=198 $g/m^2$) and 1 ply of "CSM 8600" was stacked (Vf=32.4%) in a mold. Thereafter, 50 parts of "Epiclon 830" as Component A, 70 parts of "SY monomer G" as Component B, 58 parts of "MT 500" (epoxy/acid anhydride equivalent weight ratio=0.45) as Component C, 5 parts of "2E4MZ" as Component D, and 1 part of "Perhexa 3M" as Component E were injected into the mold, and the mold was removed.

COMPARATIVE EXAMPLE 9

In the same manner as in Example 8, 7 plies of "CSM 8600" was stacked (Vf=33.0%). Thereafter, 100 parts of a bisphenol A type epoxy resin ("E 828", supplied by Yuka Shell Epoxy Kabushiki Kaisha) in place of the bisphenol F type epoxy resin as Component A, 22.5 parts of isophoronediamine (epoxy/—NH equivalent weight ratio=1.0), which was an alicyclic amine curing agent, as Component C, and 5 parts of salicylic acid as Component D were injected into the mold, and the mold was removed 5 minutes after the injection. In the resultant molded article, the fibers were impregnated about 500 mm deep, but not impregnated to their end portion. In the impregnation portion, a whitening due to voids was observed in its end portion.

COMPARATIVE EXAMPLE 10

In the same manner as in Example 8, 100 parts of "Epiclon 830" as Component A, 94 parts of "MT 500" (Comparative Examples 10 to 14: epoxy/held anhydride equivalent weight ratio=1.0) as Component C, and 10 parts of "2E4MZ" as Component D were injected into a mold, and the mold was removed 10 minutes after the injection. The molded article was softened, and deformed when the mold was removed.

COMPARATIVE EXAMPLE 11

In the same manner as in Example 11, 100 parts of "SY monomer G" as Component B, 117 parts of "MT 500" as Component C, 5 parts of "2E4MZ" as Component D, and 1 part of "Perhexa 3M" as Component E were injected into a mold, and the mold was removed 10 minutes after the injection. The resultant mold article was fragile, and showed sink marks caused due to curing shrinkage.

COMPARATIVE EXAMPLE 12

In the same manner as in Example 8, 50 parts of triglycidyl-4-amino-m-cresol ("ELM 100" supplied by Sumitomo Chemical Co., Ltd.) in place of the bisphenol F type epoxy resin as Component A, 50 parts of "SY monomer G" as Component B, 136 parts of "MT 500" as Component C, 5 parts of "2E4MZ" as Component D, and 1 part of "Perhexa 3M" as Component E were injected into a mold, and the mold was removed 5 minutes after the injection. The resultant molded article was fragile, and showed sink marks caused due to curing shrinkage.

COMPARATIVE EXAMPLE 13

In the same manner as in Example 8, 50 parts of "Epiclon 830" as Component A, 50 parts of t-butyl methacrylate ("Light Ester TB", supplied by Kyoeisha Chemical Co., Ltd.) as a reactive diluent, 47 parts of "MT 500" as Component C, 5 parts of "2E4MZ" as Component D, and 1 part of "Perhexa 3M" as Component E were injected into a mold, and the mold was removed 10 minutes after the injection. The molded article was softened, and deformed when the mold was removed.

COMPARATIVE EXAMPLE 14

In the same manner as in Example 8, 80 parts of a bisphenol A type epoxy resin "E 828" as component A, 20 parts of 1,4-butanediol diglycidyl ether ("DY 022", supplied by CIBA-GEIGY (Japan) Ltd.) as a reactive diluent, 94 parts of "MT 500" as Component C, and 10 parts of "2E4MZ" as Component D were injected into a mold, and the mold was removed 10 minutes after the injection. The molded article was softened, and deformed when the mold was removed.

According to the present invention, large-sized fiber-reinforced resin composite materials being excellent in heat resistance, mechanical properties and moldability, being substantially free from any void and defect and having a high resin density can be produced by a reaction injection molding (RIM) or RTM method.

TABLE 1

| | Example | | | | | | |
|---|---|---|---|---|---|---|---|
| | 1 | 2 | 3 | 4 | 5 | 6 | 7 |
| Bisphenol F type epoxy resin ("Epiclon 830") | 50 | 70 | | | | | |
| Bisphenol A type epoxy resin ("E 828") | | | | | | | |
| Bisphenol A type epoxy resin (E 827) | | | 50 | 70 | | | |
| Glycidylamine type epoxy resin ("ELM 100") | | | | | 80 | | |
| Glycidylamine type epoxy resin (TETRAD-X) | | | | | | 70 | |
| Alicyclic epoxy resin (ELM 4221) | | | | | | | 70 |
| Glycidyl methacrylate ("SY monomer G") | 50 | 30 | 50 | 30 | | | |
| 1,6-Hexanediol.glycidyl ether.acrylate ("R-7038") | | | | | 20 | 30 | 30 |
| t-Butyl methacrylate (Light Ester TB) | | | | | | | |
| 1,4-Butanediol diglycidyl ether ("DY-022") | | | | | | | |
| Propylene glycol diglycidyl ether ("Epolight 400P") | | | | | | | |
| Acid anhydride curing | 106 | | 104 | | 132 | | |

TABLE 1-continued

| | | | | | | | |
|---|---|---|---|---|---|---|---|
| agent ("MT 500") | | | | | | | |
| Acid anhydride curing agent ("MTA 15") | | 108 | | 106 | | 142 | 100 |
| Isophoronediamine | | | | | | | |
| Curing promoter ("2E4MZ") | 5 | 5 | 5 | 5 | 8 | 8 | |
| Curing promoter (triphenylphosphine) | | | | | | | 10 |
| Curing promoter (Salicylic acid) | | | | | | | |
| Radical polymerization initiator ("Perhexa 3M") | 1 | 1 | | | 1 | 1 | 1 |
| Radical polymerization ("Perbutyl O") | | | 1 | 1 | | | |
| RESIN PROPERTIES | | | | | | | |
| Mixture viscosity (cps/25° C.) | 34 | 450 | 82 | 2,060 | 270 | 870 | 580 |
| Tg (°C.) | 158 | 163 | 156 | 162 | 159 | 165 | 167 |
| Flexural strength (kg/mm$^2$) | 17.2 | 16.8 | 17.1 | 17.3 | 17.2 | 16.9 | 17.1 |
| Flexural modulus (kg/mm$^2$) | 420 | 418 | 425 | 410 | 390 | 415 | 410 |
| Breaking strain (%) | 5.7 | 5.5 | 5.2 | 5.8 | 6.8 | 5.3 | 5.7 |
| COMPOSITE MATERIAL PROPERTIES | | | | | | | |
| Nonimpregnation portion and void | no | no | no | partly whitened | no | no | no |
| Flextrual strength (kg/m$^2$) | 47.5 | 67.5 | 45.7 | 46.2 | 47.2 | 80.2 | 78.8 |
| Flexural modulus (kg/mm$^2$) | 1,720 | 3,020 | 1,690 | 1,710 | 1,700 | 5,560 | 5,310 |

| | Comparative Example | | | | | | | |
|---|---|---|---|---|---|---|---|---|
| | 1 | 2 | 3 | 4 | 5 | 6 | 7 | 8 |
| Bisphenol F type epoxy resin ("Epiclon 830") | | 100 | | | | 50 | | |
| Bisphenol A type epoxy resin ("E 828") | 100 | | | | | | | |
| Bisphenol A type epoxy resin (E 827) | | | | | | | 80 | |
| Glycidylamine type epoxy resin ("ELM 100") | | | 100 | | | | | |
| Glycidylamine type epoxy resin (TETRAD-X) | | | | | | | | 60 |
| Alicyclic epoxy resin (ELM 4221) | | | | | | | | |
| Glycidyl methacrylate ("SY monomer G") | | | | 100 | | | | |
| 1,6-Hexanediol.glycidyl ether.acrylate ("R-7038") | | | | | 100 | | | |
| t-Butyl methacrylate (Light Ester TB) | | | | | 50 | | | |
| 1,4-Butanediol diglycidyl ether ("DY-022") | | | | | | | | 40 |
| Propylene glycol diglycidyl ether ("Epolight 400P") | | | | | | 20 | | |
| Acid anhydride curing agent ("MT 500") | | 94 | 155 | 117 | 39 | 47 | 83 | 151 |
| Acid anhydride curing agent ("MTA 15") | | | | | | | | |
| Isophoronediamine | 22.5 | | | | | | | |
| Curing promoter ("2E4MZ") | | 10 | 10 | 5 | 5 | 5 | 10 | 10 |
| Curing promoter (triphenylphosphine) | | | | | | | | |
| Curing promoter (Salicylic acid) | 5 | | | | | | | |
| Radical polymerization initiator ("Perhexa 3M") | | | | 1 | 1 | 1 | | |
| Radical polymerization ("Perbutyl O") | | | | | | | | |
| RESIN PROPERTIES | | | | | | | | |
| Mixture viscosity (cps/25° C.) | 4,700 | 370 | 300 | 15 | 105 | 46 | 261 | 227 |
| Tg (°C.) | 145 | 116 | 186 | 154 | rubbery | 122 softened | 118 | 124 |

TABLE 1-continued

| | | | | | | | | |
|---|---|---|---|---|---|---|---|---|
| Flexural strength (kg/mm$^2$) | 12.0 | 16.2 | 14.7 | 11.1 | 2.9 | 7.6 | 14.3 | 16.7 |
| Flexural modulus (kg/mm$^2$) | 430 | 361 | 425 | 450 | 83 | 333 | 339 | 374 |
| Breaking strain (%) | 3.8 | 11.5 | 2.0 | 2.5 | 30< | 2.4 | 12.5 | 9.2 |
| COMPOSITE MATERIAL PROPERTIES | | | | | | | | |
| Nonimpregnation portion and void | yes | (softened) | (sink mark and crack) | — | — | (softened) | (softened) | no |
| Flextrual strength (kg/m$^2$) | 35.7 | 39.2 | 33.6 | 26.7 | — | 27.2 | 40.7 | 41.3 |
| Flexural modulus (kg/mm$^2$) | 1,280 | 1,370 | 1,250 | 1,130 | — | 1,170 | 1,220 | 1,410 |

TABLE 2

| | Example | | | |
|---|---|---|---|---|
| | 8 | 9 | 10 | 11 |
| Bisphenol F type epoxy resin ("Epiclon 830") | 50 | 50 | 50 | 50 |
| Bisphenol A type epoxy resin ("E 828") | | | | |
| Glycidylamine type epoxy resin ("ELM 100") | | | | |
| Glycidyl methacrylate ("SY monomer G") | 50 | 50 | 20 | 70 |
| t-Butyl methacrylate (Liht Ester TB) | | | | |
| 1,4-Butanediol diglycidyl ether ("DY-022") | | | | |
| Methyl tetrahydrophthalic anhydride ("MT 500") | 106 | 84 | 70 | 58 |
| Isophoronediamine | | | | |
| Curing promoter ("2E4MZ") | 5 | 5 | 5 | 5 |
| Curing promoter (Salicylic acid) | | | | |
| Radical polymerization initiator ("Perhexa 3M") | 1 | 1 | 1 | 1 |
| RESIN PROPERTIES | | | | |
| Mixture viscosity (cps/25° C.) | 34 | 38 | 78 | 28 |
| Tg (°C.) | 158 | 148 | 144 | 150 |
| Flexural strength (kg/mm$^2$) | 17.2 | 17.3 | 17.0 | 17.1 |
| Flexural modulus (kg/mm$^2$) | 420 | 413 | 391 | 422 |
| Breakin strain (%) | 5.7 | 6.8 | 6.8 | 6.7 |
| COMPOSITE MATERIAL PROPERTIES | | | | |
| Nonimpregnation portion and void | no | no | no | no |
| Flextrual strength (kg/m$^2$) | 38.2 | 37.5 | 42.5 | 50.3 |
| Flexural modulus (kg/mm$^2$) | 1,550 | 1,530 | 2,070 | 4,100 |

| | Comparative Example | | | | | |
|---|---|---|---|---|---|---|
| | 9 | 10 | 11 | 12 | 13 | 14 |
| Bisphenol F type epoxy resin ("Epiclon 830") | | 100 | | | | |
| Bisphenol A type epoxy resin ("E 828") | 100 | | | | | 80 |
| Glycidylamine type epoxy resin ("ELM 100") | | | | 50 | | |
| Glycidyl methacrylate ("SY monomer G") | | | 100 | 50 | | |
| t-Butyl methacrylate (Light Ester TB) | | | | | 50 | |
| 1,4-Butanediol diglycidyl ether ("DY-022") | | | | | | 20 |
| Methyl tetrahydrophthalic anhydride ("MT 500") | 94 | 117 | 136 | 47 | | 94 |

TABLE 2-continued

| | | | | | | |
|---|---|---|---|---|---|---|
| Isophoronediamine | 22.5 | | | | | |
| Curing promoter ("2E4MZ") | | 10 | 5 | 5 | 5 | 10 |
| Curing promoter (Salicylic acid) | | 5 | | | | |
| Radical polymerization initiator ("Perhexa 3M") | | | 1 | 1 | 1 | |
| RESIN PROPERTIES | | | | | | |
| Mixture viscosity (cps/25° C.) | 4,700 | 370 | 15 | 30 | 46 | 380 |
| Tg (°C.) | 145 | 116 | 154 | 165 | 122 | 120 (softened) |
| Flexural strength (kg/mm$^2$) | 12.0 | 16.2 | 11.1 | 12.8 | 7.6 | 14.8 |
| Flexural modulus (kg/mm$^2$) | 430 | 361 | 450 | 435 | 333 | 320 |
| Breaking strain (%) | 3.8 | 11.5 | 2.5 | 2.0 | 2.4 | 11.3 |
| COMPOSITE MATERIAL PROPERTIES | | | | | | |
| Nonimpregnation portion and void | yes | — | — | — | — | — |
| Flextrual strength (kg/m$^2$) | 25.3 | 33.2 | 21.5 | 23.8 | 25.7 | 34.2 |
| Flexural modulus (kg/mm$^2$) | 1,030 | 1,140 | 1,020 | 860 | 1,020 | 920 |

What is claimed is:

1. An injection molded fiber-reinforced cured resin product which comprises
   at least one reinforcing fiber and
   a reactive resin composition which consists essentially of the following Components A, B, C, D and E:
   Component A: an epoxy resin having at least two epoxy groups in the molecule,
   Component B: a polymerizable unsaturated group-containing epoxy compound of the following general formula [I],

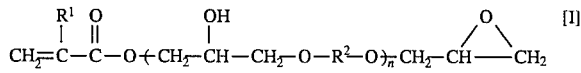

wherein R$^1$ is H or CH$_3$, R$^2$ is an alkylene group having 1 to 20 carbon atoms, and n is an integer of 0 to 20,
   Component C: a liquid carboxylic acid anhydride containing a monofunctional carboxylic acid anhydride and/or a polyfunctional carboxylic acid anhydride obtained by reacting a lower aliphatic polyhydric alcohol with a trimellitic acid,
   Component D: a curing promoter selected from the group consisting of a Lewis acid, BF$_3$, an amine complex, a tertiary amine or salt thereof, an imidazole or complex thereof and an organic phosphine compound,
   Component E: a radical polymerization initiator, provided that the glass transition temperature (Tg, °C.) and breaking strain (E, %) of an injection molded cured resin product of said reactive resin composition containing no reinforcing fibers satisfies the following properties:

$Tg \geq -17E+240$, $E \geq 4$, and $Tg \geq 125$.

2. An injection molded fiber-reinforced cured resin product according to claim 1, wherein the injection molding method is selected from the group consisting of a RIM process, a RRIM process, a SRIM process and a RTM process.

3. An injection molded fiber-reinforced cured resin product according to claim 1, wherein component A of the resin composition is a bisphenol F type epoxy resin.

4. An injection molded fiber-reinforced cured resin product according to claim 1, wherein Component B of the resin composition is glycidyl methacrylate.

5. An injection molded fiber-reinforced cured resin product according to claim 1, wherein the amount of the polymerizable unsaturated group-containing epoxy compound per 100 parts of Component A of the resin composition is 5 to 300 parts by weight.

6. An injection molded fiber-reinforced cured resin product according to claim 1, wherein the liquid carboxylic acid anhydride of the resin composition is contained in such an amount that the equivalent weight ratio of the carboxylic acid anhydride functional group thereof to epoxy groups of Components A and B is 1.0/0.3 to 1.0/1.4.

7. An injection molded fiber-reinforced cured resin product according to claim 1, wherein the resin composition contains a liquid carboxylic acid anhydride of 2 to 80% by weight, based on the monofunctional carboxylic acid anhydride, of the polyfunctional carboxylic acid anhydride.

8. An injection molded fiber-reinforced cured resin product according to claim 1, wherein the resin composition contains a monofunctional carboxylic acid anhydride which has a viscosity, at 25° C., of 500 cps.

9. An injection molded fiber-reinforced cured resin product according to claim 1, wherein the resin product contains 2 to 70% by volume of the reinforcing fiber.

10. An injection molded fiber-reinforced cured resin product according to claim 9, wherein the reinforcing fiber is formed of a continuous fiber.

11. An injection molding method for forming an injection molded cured resin product comprising:
   injecting a mixture of a reactive resin composition into a mold containing at least one reinforcing fiber and
   curing the resulting mixture to form the injection molded cured composition,
   wherein said reactive resin composition consists essentially of the following Components A, B, C, D and E:
   Component A: an epoxy resin having at least two epoxy groups in the molecule, Component B: a polymerizable unsaturated group-containing epoxy compound of the following general formula [I],

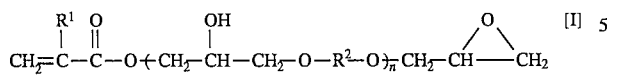

wherein $R^1$ is H or $CH_3$, $R^2$ is an alkylene group having 1 to 20 carbon atoms, and n is an integer of 0 to 20, Component C: a liquid carboxylic acid anhydride containing a monofunctional carboxylic acid anhydride and/or a polyfunctional carboxylic acid anhydride obtained by reacting a lower aliphatic polyhydric alcohol with a trimellitic acid, Component D: a curing promoter selected from the group consisting of a Lewis acid, $BF_3$, an amine complex, a tertiary amine or salt thereof, an imidazole or complex thereof and an organic phosphine compound, Component E: a radical polymerization initiator; provided that the glass transition temperature (Tg, °C.) and breaking strain (E, %) of an injection molded cured resin product of said reactive resin composition containing no reinforcing fibers satisfies the following properties:

$Tg \geq -17E + 240$, $E \geq 4$, and $Tg \geq 125$.

12. A method according to claim 11, wherein the injection molding method is selected from the group consisting of a RIM process, a RRIM process, a SRIM process and a RTM process.

13. A method according to claim 11, wherein Component A of the resin composition is a bisphenol F type epoxy resin.

14. A method according to claim 11, wherein Component B of the resin composition is glycidyl methacrylate.

15. A method according to claim 11, wherein the amount of the polymerizable unsaturated group-containing epoxy compound per 100 parts of Component A of the resin composition is 5 to 300 parts by weight.

16. A method according to claim 11, wherein the liquid carboxylic acid anhydride of the resin composition is contained in such an amount that the equivalent weight ratio of the carboxylic acid anhydride functional group thereof to epoxy groups of Components A and B is 1.0/0.3 to 1.0/1.4.

17. A method according to claim 11, wherein the resin composition contains a liquid carboxylic acid anhydride of 2 to 80% by weight, based on the monofunctional carboxylic acid anhydride, of the polyfunctional carboxylic acid anhydride.

18. A method according to claim 11, wherein the resin product contains a monofunctional carboxylic acid anhydride which has a viscosity, at 25° C., of 500 cps.

19. A method according to claim 11, wherein the resin product contains 2 to 70% by volume of the reinforcing fiber.

20. A method according to claim 10, wherein the reinforcing fiber is formed of a continuous fiber.

* * * * *